(12) United States Patent
Tsorng et al.

(10) Patent No.: US 11,761,842 B2
(45) Date of Patent: Sep. 19, 2023

(54) SYSTEMS AND METHODS OF DETECTING LEAKAGE WITHIN A CHASSIS

(71) Applicant: QUANTA COMPUTER INC., Taoyuan (TW)

(72) Inventors: Yaw-Tzorng Tsorng, Taoyuan (TW); Ming-Lung Wang, Taoyuan (TW); Hong-Yi Huang, Taoyuan (TW); Yuan-Chi Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 191 days.

(21) Appl. No.: 17/373,159

(22) Filed: Jul. 12, 2021

(65) Prior Publication Data

US 2022/0307936 A1 Sep. 29, 2022

Related U.S. Application Data

(60) Provisional application No. 63/166,872, filed on Mar. 26, 2021.

(51) Int. Cl.
*G01M 3/10* (2006.01)
*G01M 3/32* (2006.01)

(52) U.S. Cl.
CPC ............ *G01M 3/10* (2013.01); *G01M 3/3245* (2013.01)

(58) Field of Classification Search
CPC ............ G01M 3/02; G01M 3/04; G01M 3/06; G01M 3/10
See application file for complete search history.

(56) References Cited

U.S. PATENT DOCUMENTS

| 5,241,852 A * | 9/1993 | Takahashi ............... G01M 3/10 73/49.3 |
| 8,347,690 B2 * | 1/2013 | Lo ....................... G01M 3/3272 73/40 |
| 10,073,001 B2 * | 9/2018 | Luedolph .............. G01M 3/202 |
| 2015/0276542 A1 | 10/2015 | Bowen et al. |

FOREIGN PATENT DOCUMENTS

| CN | 201852681 U | 6/2011 |
| CN | 103411738 A | 11/2013 |
| CN | 108507726 A | 9/2018 |
| JP | 2002-168725 A | 6/2002 |

OTHER PUBLICATIONS

Li, Can Detect the Air Tightness of the Mechanism of Automobile Fittings, Sep. 2018, FIT Computer Translation (Year: 2018).*
TW Office Action for Application No. 110130625, dated Dec. 6, 2022, w/ First Office Action Summary.
TW Search Report for Application No. 110130625, dated Dec. 6, 2022, w/ First Office Action.

* cited by examiner

*Primary Examiner* — Erika J. Villaluna
(74) *Attorney, Agent, or Firm* — NIXON PEABODY LLP

(57) ABSTRACT

A method of detecting leakage within a chassis includes mounting the chassis on a plate disposed in a sealed chamber and fluidly connecting, by a pipe, an interior space of the sealed chamber to a water tank such that a bottom end of the pipe is under a surface of water in the water tank. The method further includes determining, such as observing, whether bubbles are formed at the bottom end of the pipe due to pressurized air flowing into the pipe. The method also includes determining presence of a leak in the chassis due to pressurized air flowing between the chassis and the sealed chamber, before flowing into the pipe.

13 Claims, 2 Drawing Sheets

SYSTEMS AND METHODS OF DETECTING LEAKAGE WITHIN A CHASSIS

CROSS-REFERENCE TO RELATED APPLICATIONS

This application claims priority from and benefit of U.S. Provisional Application No. 63/166,872, entitled "Apparatus and Method for Detecting Leakage," and filed on Mar. 26, 2021. The contents of that application are hereby incorporated by reference in their entirety.

FIELD OF THE INVENTION

The present invention relates generally to detecting leakage, and more specifically, to systems and methods of detecting leakage within a chassis.

BACKGROUND OF THE INVENTION

The Ingress Protection Rating, established by the International Electrotechnical Commission, defines grades of protection provided by the mechanical and electrical housings of a chassis against intrusion, dust, accidental contact, and water. For example, IP6X defines criteria for classifying a chassis as dustproof, and IPX7 defines criteria for classifying a chassis as waterproof. Both IP6X and IPX7 grades require that the chassis be leak-tested during production and before certification as dustproof and waterproof.

Current methods of detecting leakages to certify a chassis as waterproof and dustproof have various challenges. For example, the leakage detection test is time-consuming because it takes time to dry a chassis after it is immersed in water. On the other hand, the air tightness test is expensive because gas is filled into a chassis or is vacuumed from the chassis to stabilize the pressure in the chassis, and thus needs strict requirements for gas pressure and flow control. Accordingly, it is desirable to have an accurate, efficient, and inexpensive method of detecting leakage from a chassis in a production environment.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a method of detecting leakage within a chassis is disclosed. The method includes mounting the chassis on a plate disposed in a sealed chamber and fluidly connecting, by a pipe, an interior space of the sealed chamber to a water tank such that a bottom end of the pipe is under a surface of water in the water tank. The method further includes determining whether bubbles are formed at the bottom end of the pipe due to pressurized air flowing into the pipe. The method also includes determining presence of a leak in the chassis due to pressurized air flowing between the chassis and the sealed chamber, before flowing into the pipe.

According to certain aspects of the present disclosure, the bubbles are observable through a window on an outer surface of the water tank.

According to certain aspects of the present disclosure, the chassis is a component of an outdoor electronic equipment.

According to certain aspects of the present disclosure, the pressurized air has between about 10 kPa and about 20000 kPa of pressure.

According to certain aspects of the present disclosure, the pressurized air is applied for a period of time between about 10 seconds and about 180 seconds.

According to certain aspects of the present disclosure, the chassis is sealably covered with a lid. In such aspects, the method further includes providing the pressurized air into the chassis using a conduit through the lid. In such aspects, the presence of the leak in the chassis is determined based on the pressurized air flowing from the chassis to the sealed chamber.

According to certain aspects of the present disclosure, the chassis is not sealably covered with a lid. In such aspects, the method further includes providing the pressurized air directly into the sealed chamber. In such aspects, the presence of the leak in the chassis is determined based on the pressurized air flowing from the sealed chamber to the chassis. In such aspects, the chassis is mounted on the plate through a transfer plate coupled to the plate, the chassis being sealably mounted on the transfer plate.

According to certain aspects of the present disclosure, a system for detecting leakage within a chassis is disclosed. The system includes a sealed chamber, a plate disposed on the sealed chamber, an air tube fluidly connected to the sealed chamber, and a water tank. The plate is used for mounting the chassis. The air tube is configured to deliver pressurized air into an interior space of the sealed chamber. The water tank is fluidly connected to the sealed chamber by a pipe such that a bottom end of the pipe is under a surface of water in the water tank.

According to certain aspects of the present disclosure, the system further includes a window on an outer surface of the water tank for observing whether bubbles are formed at the bottom end of the pipe.

According to certain aspects of the present disclosure, the plate separates the sealed chamber from the water tank.

According to certain aspects of the present disclosure, the system further includes a transfer plate coupled to the plate for sealably mounting the chassis, if the chassis is not sealably covered with a lid.

According to certain aspects of the present disclosure, the system further includes a compressor coupled to the air tube for delivering pressurized air having between about 10 kPa and about 20000 kPa of pressure.

According to certain aspects of the present disclosure, the system further includes a pressure meter coupled to the air tube for detecting pressure of pressurized air delivered to the sealed chamber.

According to certain aspects of the present disclosure, the system further includes a conduit fluidly connecting the air tube and an interior space of the chassis through the lid, if the chassis is sealably covered with a lid.

The above summary is not intended to represent each embodiment or every aspect of the present disclosure.

Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1A:
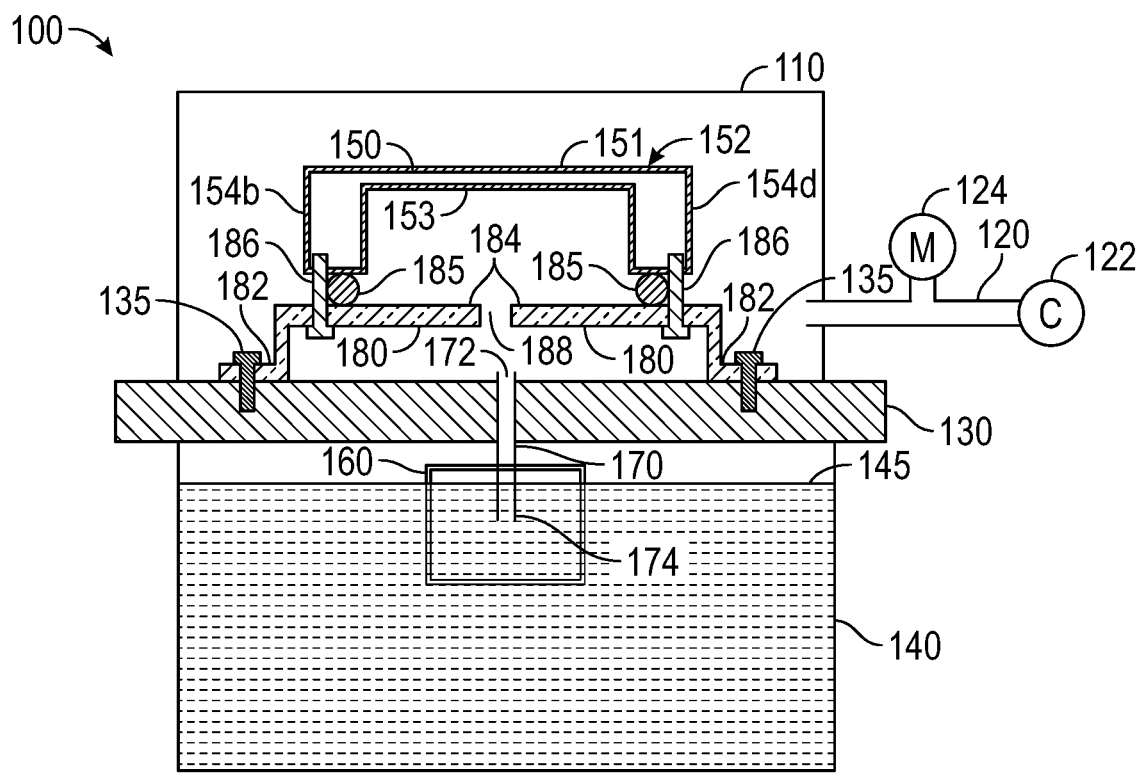
FIG. 1A shows schematic side view of a system for detecting leakage within a chassis not sealably covered with a lid, according to certain aspects of the present disclosure.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Embodiments of the disclosure are directed to systems and methods of detecting leakage within a chassis. The methods and systems described herein enable a leakage in the chassis to be detected easily by determining, such as visually observing, presence of bubbles in water of a water tank fluidly connected to a sealed chamber in which the chassis is placed. Presence of the bubbles confirms leakage of pressurized air from the chassis into the sealed chamber, without requiring the chassis to be immersed in water of the water tank.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 1B:
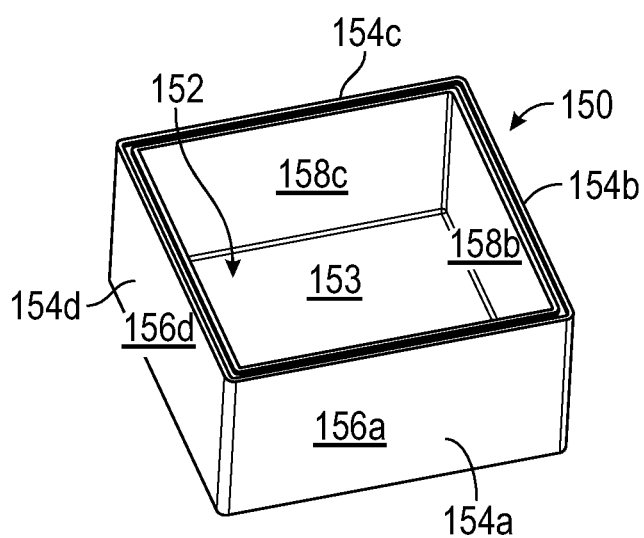
FIG. 1B shows a perspective view of the chassis not sealably covered with a lid and tested using the system of FIG. 1A, according to certain aspects of the present disclosure.

FIG. 1A shows a schematic side view of a system 100 for detecting leakage within a chassis 150 not sealably covered with a lid. The chassis 150 is a component which cannot seal itself by a single part. A perspective view of the chassis 150 is shown in FIG. 1B. The chassis 150 may be formed from a metal or alloy for housing mechanical and electrical components therein. In some embodiments, the chassis 150 is a component of an outdoor electronic equipment. As shown in FIGS. 1A-1B, the chassis 150 has a bottom plate 152 surrounded by four wall plates 154a, 154b, 154c, 154d. The bottom plate 152 has an external surface 151 and an internal surface 153. Each of the four wall plates 154a, 154b, 154c, 154d has an outer surface 156a, 156b, 156c, 156d and an inner surface 158a, 158b, 158c, 158d. The chassis 150 is tested for leakage within the system 100.

The system 100 includes a sealed chamber 110 and a plate 130 disposed on the sealed chamber 110 for mounting the chassis 150. The sealed chamber 110 is configured to prevent flow of air thereto, except through an air tube 120 and a pipe 170. The air tube 120 is fluidly coupled to a compressor 122 outside the sealed chamber 110 for delivering pressurized air into an interior space of the sealed chamber 110. A pressure meter 124 is coupled to the air tube 120 for detecting pressure of pressurized air delivered to the sealed chamber 110 and displaying the value of the detected pressure.

A water tank 140 is disposed under the sealed chamber 110. The water is filled to a surface of water 145 in the water tank 140. The plate 130 separates the sealed chamber 110 from the water tank 140. The water tank 140 is fluidly connected to the sealed chamber 110 by the pipe 170 through the plate 130, such that air can flow between the sealed chamber 110 and the water in the water tank 140 through the pipe 170. The pipe 170 has a top end 172 opening into the sealed chamber 110 and a bottom end 174 under the surface of water 145 in the water tank 140. In some embodiments, such as the one shown in FIG. 1A, the water tank 140 has a window 160 on an outer surface for observing the surface of water 145 in the water tank 140 and whether any bubbles are formed at the bottom end 174 of the pipe 170. In other embodiments, the water tank 140 may have a transparent outer wall for observing the surface of water 145 in the water tank 140 and whether any bubbles are formed at the bottom end 174 of the pipe 170.

In some embodiments, a transfer plate 180 is coupled to the plate 130 for sealably mounting the chassis 150 within the sealed chamber 110. In some embodiments, such as the one shown in FIG. 1A, the transfer plate 180 has a stepped configuration where a lower step 182 is coupled to the plate 130 through fasteners 135, and an upper step 184 is used for sealably coupling the chassis 150 along the four wall plates 154a, 154b, 154c, 154d (154a, 154c shown in FIG. 1B) through a sealing component 185, such as an O-ring, and fasteners 186. The transfer plate 180 has an aperture 188 to enable flow of air between the chassis 150 and the pipe 170. In other embodiments, the chassis 150 may be directly mounted on the plate 130 and sealably coupled thereto using an O-ring (not shown).

In operation, once the chassis 150 is mounted on the plate 130 in the sealed chamber 110, either directly or through the transfer plate 180, the sealed chamber 110 is closed. The compressor 122 is operated to deliver pressurized air into the sealed chamber 110, and the pressure of the pressurized air is detected using the pressure meter 124. The delivered pressurized air generally has a pressure between about 10 kiloPascals ("kPa") and about 20000 kPa and maintained for between about 10 seconds and about 3 minutes. If there is a leaking hole in the chassis 150, the pressurized air from the sealed chamber 110 would enter the chassis 150 through the leaking hole and flow through the aperture 188 in the transfer plate 180 into the water in the water tank 140. The presence of any leakage in the chassis 150 is manifested through formation of bubbles at the bottom end 174 of the pipe 170 under the surface of the water 145 in the water tank 140.

Figure 2A:
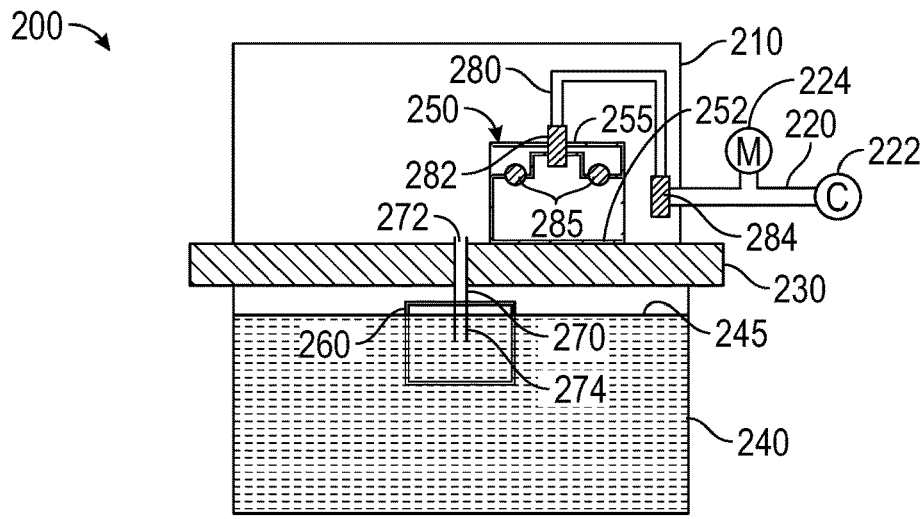
FIG. 2A shows a schematic side view of a system for detecting leakage within a chassis sealably covered with a lid, according to certain aspects of the present disclosure.
Figure 2B:
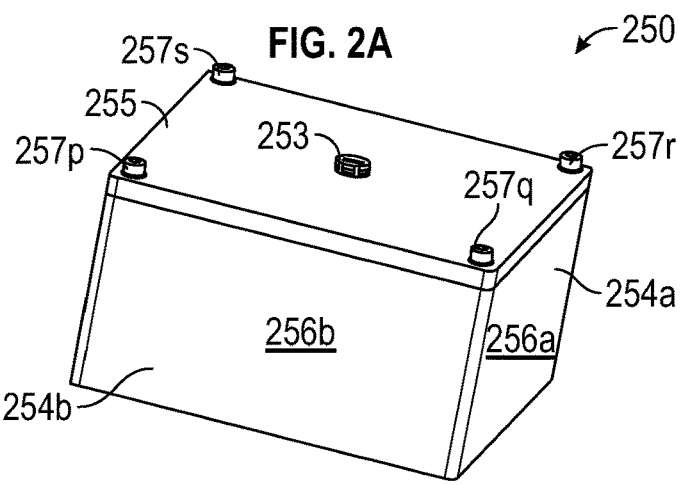
FIG. 2B shows a perspective view of the chassis sealably covered with a lid and tested using the system of FIG. 2A, according to certain aspects of the present disclosure.

FIG. 2A shows a schematic side view of a system 200 for detecting leakage within a chassis 250 sealably covered with a lid. A perspective view of the chassis 250 is shown in FIG. 2B. The chassis 250 may be formed from a metal or alloy for housing mechanical and electrical components therein. In some embodiments, the chassis 250 is a component of an outdoor electronic equipment. As shown in FIGS. 2A-2B, the chassis 250 has a bottom plate 252 surrounded by four wall plates 254a, 254b, 254c, 254d. The chassis 250 is sealably covered by a lid 255. Each of the four wall plates 254a, 254b, 254c, 254d has an outer surface 256a, 256b, 256c, 256d and an inner surface 258a, 258b, 258c, 258d (not shown). The lid 255 is sealably coupled along edges of the four walls plates 254a, 254b, 254c, 254d along the corners joining them through fasteners 25'7p, 257q, 257r, 257s. The lid 255 has a knob 253 for moving the lid 255 to and from the rest of the chassis 250. The chassis 250 is tested for leakage within the system 200.

The system 200 includes a sealed chamber 210 and a plate 230 disposed on the sealed chamber 210 for mounting the chassis 250. The sealed chamber 210 is configured to prevent flow of air thereto, except through an air tube 220 and a pipe 270. The air tube 220 is fluidly coupled to a compressor 222 outside the sealed chamber 210 for delivering pressurized air into an interior space of the chassis 250 in the sealed chamber 210 through the lid 255. A pressure meter 224 is coupled to the air tube 220 for detecting pressure of pressurized air delivered to the sealed chamber 210 and displaying the value of the detected pressure.

A conduit 280 fluidly connects the air tube 220 and the interior space of the chassis 250 through the lid 255. The conduit 280 has a fitting 282 at its junction with the lid 255 and a fitting 284 at its junction with the air tube 220. The fittings 282, 284 may be formed from a metal or a plastic material. The lid is sealably coupled to the chassis 250 using an O-ring 285.

A water tank 240 is disposed under the sealed chamber 210. The water is filled to a surface of water 245 in the water tank 240. The plate 230 separates the sealed chamber 210 from the water tank 240. The water tank 240 is fluidly connected to the sealed chamber 210 by the pipe 270 through the plate 230 such that air can flow between the sealed chamber 210 and the water in the water tank 240 through the pipe 270. The pipe 270 has a top end 272 opening into the sealed chamber 210 and a bottom end 274 under the surface of water 245 in the water tank 240. In some embodiments, such as the one shown in FIG. 2A, the water tank 240 has a window 260 on an outer surface for observing the surface of water 245 in the water tank 240 and whether any bubbles are formed at the bottom end 274 of the pipe 270. In other embodiments, the water tank 240 may have a transparent outer wall for observing the surface of water 245 in the water tank 240 and whether any bubbles are formed at the bottom end 274 of the pipe 270.

In operation, once the chassis 250 is mounted on the plate 230 in the sealed chamber 210, the sealed chamber 210 is closed. The compressor 222 is operated to deliver pressurized air into the sealed chamber 210, and the pressure of the pressurized air is detected using the pressure meter 224. The delivered pressurized air generally has a pressure between about 10 kPa and about 20000 kPa and maintained for between about 10 seconds and about 3 minutes. If there is a leaking hole in the chassis 250, the pressurized air from the chassis 250 enters the sealed chamber 210 through the leaking hole and escapes through the pipe 270 into the water in the water tank 140. The presence of any leakage in the chassis 250 is manifested through formation of bubbles at the bottom end 274 of the pipe 270 under the surface of the water 245 in the water tank 240.

Figure 3:
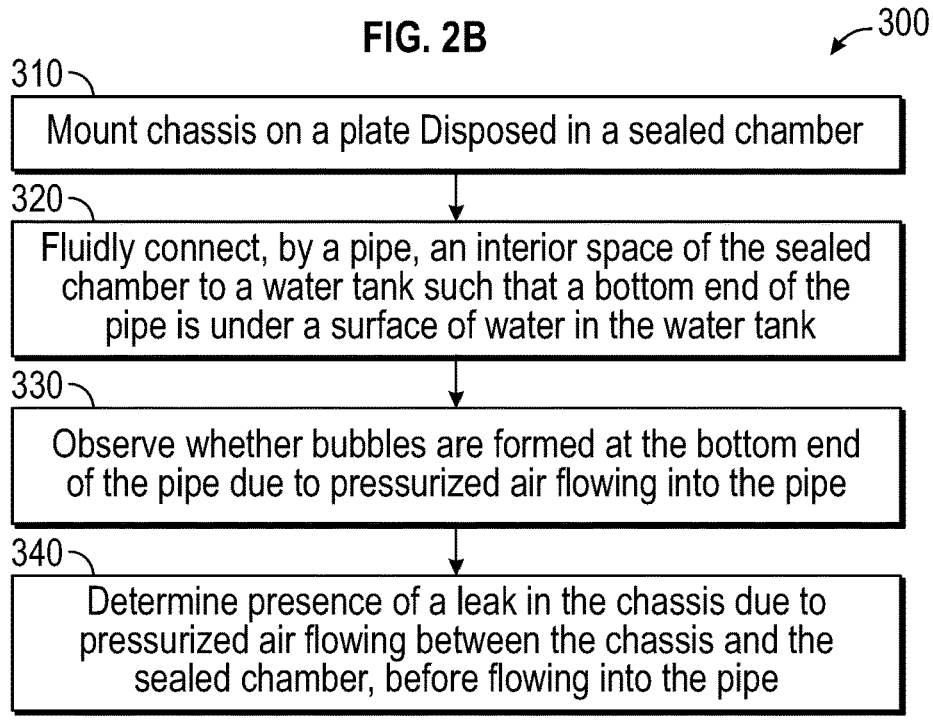
FIG. 3 shows a block diagram for a method of detecting leakage within the chassis of FIG. 1B and FIG. 2B, according to certain aspects of the present disclosure.

FIG. 3 shows a block diagram for a method 300 of detecting leakage within the chassis of FIG. 1B and FIG. 2B. The method 300 starts in block 310, where a chassis is mounted on a plate disposed in a sealed chamber. The chassis is a component of an outdoor electronic equipment, and may or may not be sealably covered with a lid. If the chassis is not sealably covered with a lid, the chassis may be sealably mounted in the sealed chamber through a transfer plate coupled to the plate, as described above and shown in FIG. 1B.

In block 320, an interior space of the sealed chamber is fluidly connected to a water tank by a pipe such that a bottom end of the pipe is under a surface of water in the water tank.

In block 330, an operator determines whether bubbles are formed at the bottom end of the pipe due to pressurized air flowing into the pipe. According to one example, the operator makes the determination by visually observing for any formed bubbles. The pressurized air may be delivered into the sealed chamber using an air tube coupled to a compressor outside the sealed chamber, as described above and shown in FIGS. 1B and 2B. The pressurized air may have a pressure of between about 10 kPa and about 20000 kPa of pressure applied for between about 10 seconds and about 180 seconds. If the chassis is not sealably covered with a lid, the pressurized air is delivered directly into the sealed chamber (see FIG. 1B). If the chassis is sealably covered with a lid, the pressurized air is delivered into the chassis using a conduit through the lid (see FIG. 2B). As described above, the bubbles may be observed through a window on an outer surface or transparent walls of the water tank.

Finally, in block 340, presence of a leak in the chassis is determined due to pressurized air flowing between the chassis and the sealed chamber, before flowing into the pipe. If the chassis is not sealably covered with a lid, the presence of a leak in the chassis is determined based on pressurized air flowing from the sealed chamber to the chassis and into the water tank through the pipe. If the chassis is sealably covered with a lid, the presence of leak in the chassis is determined based on pressurized air flowing from the chassis to the sealed chamber and into the water tank through the pipe.

Advantageously, the systems and methods described herein provide an accurate, efficient and inexpensive way of detecting leakage in a chassis during production and prior to certification as dustproof and waterproof. There is no need to immerse the chassis in water under defined pressure conditions for a definite time period and then subsequently dry the chassis. There is also no need to procure expensive equipment for meeting strict requirements for gas pressure and flow control for an air-tightness test. Accordingly, the systems and methods described herein are able to easily and swiftly support leakage detection in a high volume of chassis used in electronic equipment.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A method of detecting leakage within a chassis, the method comprising:
   mounting the chassis on a plate disposed in a sealed chamber;
   fluidly connecting, by a pipe, an interior space of the sealed chamber to a water tank such that a bottom end of the pipe is under a surface of water in the water tank;
   determining whether bubbles are formed at the bottom end of the pipe due to pressurized air flowing into the pipe; and
   determining presence of a leak in the chassis due to pressurized air flowing between the chassis and the sealed chamber, before flowing into the pipe;
   wherein
      the chassis is not sealably covered with a lid; and
      the chassis is mounted on the plate through a transfer plate coupled to the plate, the chassis being sealably mounted on the transfer plate.

2. The method of claim 1, wherein the bubbles are observable through a window on an outer surface of the water tank.

3. The method of claim 1, wherein the chassis is a component of an outdoor electronic equipment.

4. The method of claim 1, wherein the pressurized air has between about 10 kPa and about 20000 kPa of pressure.

5. The method of claim 1, wherein the pressurized air is applied for a period of time between about 10 seconds and about 180 seconds.

6. The method of claim 1, further comprising providing the pressurized air directly into the sealed chamber.

7. The method of claim 1, wherein the presence of the leak in the chassis is determined based on the pressurized air flowing from the sealed chamber to the chassis.

8. A system for detecting leakage within a chassis, the system comprising:
   a sealed chamber;
   a plate disposed on the sealed chamber for mounting the chassis thereon;
   an air tube fluidly connected to the sealed chamber, the air tube configured to deliver pressured air into an interior space of the sealed chamber;
   a water tank fluidly connected to the sealed chamber by a pipe such that a bottom end of the pipe is under a surface of water in the water tank; and
   the chassis is not sealably covered with a lid, a transfer plate coupled to the plate for sealably mounting the chassis.

9. The system of claim 8, further comprising a window on an outer surface of the water tank for observing whether bubbles are formed at the bottom end of the pipe.

10. The system of claim 8, wherein the plate separates the sealed chamber from the water tank.

11. The system of claim 8, further comprising a compressor coupled to the air tube for delivering pressurized air having between about 10 kPa and about 20000 kPa of pressure.

12. The system of claim 8, further comprising a pressure meter coupled to the air tube for detecting pressure of pressurized air delivered to the sealed chamber.

13. The system of claim 8, wherein the chassis is a component of an outdoor electronic equipment.

* * * * *